(12) United States Patent
Dorogusker et al.

(10) Patent No.: US 7,770,036 B2
(45) Date of Patent: Aug. 3, 2010

(54) POWER MANAGEMENT IN A PORTABLE MEDIA DELIVERY SYSTEM

(75) Inventors: Jesse L. Dorogusker, Menlo Park, CA (US); Donald J. Novotney, San Jose, CA (US); Scott Krueger, Mountain View, CA (US); Jeffrey J. Terlizzi, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 879 days.

(21) Appl. No.: 11/364,414

(22) Filed: Feb. 27, 2006

(65) Prior Publication Data

US 2007/0204174 A1 Aug. 30, 2007

(51) Int. Cl.
H02J 7/00 (2006.01)
H02J 7/02 (2006.01)

(52) U.S. Cl. .................. 713/300; 361/18; 320/106; 320/107; 320/134; 320/136

(58) Field of Classification Search .................. 713/300; 361/18; 320/106, 107, 134, 136
See application file for complete search history.

(56) References Cited

U.S. PATENT DOCUMENTS

| | | | |
|---|---|---|---|
| 1,419,828 A | 6/1922 | Dornier | |
| 4,257,098 A | 3/1981 | Lacy | |
| 4,673,861 A | 6/1987 | Dubovsky et al. | |
| 4,965,738 A | 10/1990 | Bauer et al. | |
| 5,019,717 A | 5/1991 | McCurry et al. | |
| 5,103,156 A | 4/1992 | Jones et al. | |
| 5,150,031 A | 9/1992 | James et al. | |
| 5,200,685 A | 4/1993 | Sakamoto | |
| 5,206,538 A | 4/1993 | Orta | |
| 5,252,891 A | 10/1993 | Huang | |
| 5,304,916 A | 4/1994 | Le et al. | |
| 5,307,002 A | 4/1994 | Ho et al. | |

(Continued)

FOREIGN PATENT DOCUMENTS

EP 1 333 356 8/2003

(Continued)

OTHER PUBLICATIONS

"A Serial Bus on Speed Diagram: Getting Connected with FireWire", downloaded Oct. 16, 2001, PC Magazine: PC Tech (A Serial Bus on Speed), wysiwyg://51/http://www.zdnet.com/pctech/content/18/10/tu1810.007.html.

(Continued)

*Primary Examiner*—Abdelmoniem Elamin
(74) *Attorney, Agent, or Firm*—Beyer Law Group LLP

(57) ABSTRACT

A consumer electronic product that includes a media player arranged to process a selected one of a plurality of digital media files stored therein and a media delivery accessory unit detachedly connected to the media player arranged to broadcast the processed digital media file. When the consumer electronic product is in a DC mode, the consumer electronic product controls a transfer of an amount of charge between the media delivery accessory and the media player. In one embodiment, the amount of charge is sufficient to for the consumer electronic product to operate for a predetermined amount of time. In another embodiment, the amount of charge is sufficient for to maximize an amount of time that the media player and media delivery accessory can operate.

26 Claims, 6 Drawing Sheets

U.S. PATENT DOCUMENTS

| | | | |
|---|---|---|---|
| 5,349,281 A | 9/1994 | Bugaj | |
| 5,371,456 A | 12/1994 | Brainard | |
| 5,396,163 A | 3/1995 | Nor et al. | |
| 5,402,055 A | 3/1995 | Nguyen | |
| 5,471,128 A | 11/1995 | Patino et al. | |
| 5,498,950 A | 3/1996 | Ouwerkerk | |
| 5,514,945 A | 5/1996 | Jones | |
| 5,539,298 A | 7/1996 | Perkins et al. | |
| 5,579,489 A | 11/1996 | Dornier et al. | |
| 5,602,455 A | 2/1997 | Stephens et al. | |
| 5,648,712 A | 7/1997 | Hahn | |
| 5,675,813 A | 10/1997 | Holmdahl | |
| 5,752,046 A | 5/1998 | Oprescu et al. | |
| 5,754,027 A | 5/1998 | Oglesbee et al. | |
| 5,805,433 A | 9/1998 | Wood | |
| 5,808,446 A | 9/1998 | Eguchi | |
| 5,845,217 A | 12/1998 | Lindell et al. | |
| 5,955,867 A | 9/1999 | Cummings et al. | |
| 5,955,869 A | 9/1999 | Rathmann | |
| 5,964,879 A | 10/1999 | Dunstan et al. | |
| 5,982,141 A | 11/1999 | Hinohara | |
| 6,007,372 A | 12/1999 | Wood | |
| 6,025,695 A | 2/2000 | Friel et al. | |
| 6,087,804 A | 7/2000 | Suda | |
| 6,125,455 A | 9/2000 | Yeo | |
| 6,130,518 A | 10/2000 | Gabehart et al. | |
| 6,151,652 A | 11/2000 | Kondo et al. | |
| 6,152,778 A | 11/2000 | Dalton | |
| 6,167,289 A | 12/2000 | Ball et al. | |
| 6,169,387 B1 | 1/2001 | Kaib | |
| 6,178,514 B1 | 1/2001 | Wood | |
| 6,184,652 B1 | 2/2001 | Yang | |
| 6,184,655 B1 | 2/2001 | Malackowski | |
| 6,195,754 B1 * | 2/2001 | Jardine et al. | 713/324 |
| 6,204,637 B1 | 3/2001 | Rengan | |
| 6,211,581 B1 | 4/2001 | Farrant | |
| 6,211,649 B1 | 4/2001 | Matsuda | |
| 6,218,812 B1 | 4/2001 | Hanson | |
| 6,252,380 B1 | 6/2001 | Koenck | |
| 6,261,109 B1 | 7/2001 | Liu et al. | |
| 6,271,605 B1 | 8/2001 | Carkner et al. | |
| 6,283,789 B1 | 9/2001 | Tsai | |
| 6,316,916 B2 | 11/2001 | Bohne | |
| 6,329,796 B1 | 12/2001 | Popescu | |
| 6,348,776 B2 | 2/2002 | Kim | |
| 6,353,894 B1 | 3/2002 | Pione | |
| 6,357,011 B2 | 3/2002 | Gilbert | |
| 6,362,610 B1 | 3/2002 | Yang | |
| 6,363,491 B1 | 3/2002 | Endo | |
| 6,392,414 B2 | 5/2002 | Bertness | |
| 6,448,863 B1 | 9/2002 | Ogawa et al. | |
| 6,465,909 B1 | 10/2002 | Soo et al. | |
| 6,487,442 B1 | 11/2002 | Wood | |
| 6,489,751 B2 | 12/2002 | Small et al. | |
| 6,526,516 B1 | 2/2003 | Ishikawa et al. | |
| 6,531,845 B2 | 3/2003 | Kerai et al. | |
| 6,571,343 B1 | 5/2003 | Johnson et al. | |
| 6,580,460 B1 | 6/2003 | Takahashi et al. | |
| 6,614,232 B1 | 9/2003 | Mukai | |
| 6,633,932 B1 | 10/2003 | Bork et al. | |
| 6,731,751 B1 | 5/2004 | Papadopoulos | |
| 6,747,859 B2 | 6/2004 | Walbeck et al. | |
| 6,774,604 B2 | 8/2004 | Matsuda et al. | |
| 6,799,226 B1 | 9/2004 | Robbin et al. | |
| 6,820,206 B1 | 11/2004 | Kim et al. | |
| 6,917,504 B2 | 7/2005 | Nguyen et al. | |
| 6,936,936 B2 | 8/2005 | Fischer et al. | |
| 6,946,817 B2 | 9/2005 | Fischer et al. | |
| 6,969,970 B2 | 11/2005 | Dias et al. | |
| 6,993,615 B2 * | 1/2006 | Falcon | 710/303 |
| 6,995,963 B2 | 2/2006 | Fadell et al. | |
| 7,016,595 B1 | 3/2006 | Ishino et al. | |
| 7,160,113 B2 * | 1/2007 | McConnell et al. | 434/365 |
| 7,197,650 B2 | 3/2007 | Watanabe et al. | |
| 2001/0003205 A1 | 6/2001 | Gilbert | |
| 2001/0005641 A1 | 6/2001 | Matsumoto et al. | |
| 2001/0006884 A1 | 7/2001 | Matsumoto | |
| 2002/0070705 A1 | 6/2002 | Buchanan et al. | |
| 2002/0156949 A1 | 10/2002 | Kubo et al. | |
| 2003/0110403 A1 | 6/2003 | Crutchfield et al. | |
| 2004/0162029 A1 | 8/2004 | Grady | |
| 2004/0224638 A1 | 11/2004 | Fadell et al. | |
| 2004/0225804 A1 | 11/2004 | Leete | |
| 2006/0039263 A1 * | 2/2006 | Trotabas | 369/86 |
| 2006/0125446 A1 * | 6/2006 | Tupman et al. | 320/132 |
| 2006/0212637 A1 * | 9/2006 | Lo et al. | 710/303 |
| 2007/0108788 A1 * | 5/2007 | Shalam et al. | 296/37.15 |
| 2007/0247794 A1 * | 10/2007 | Jaffe et al. | 361/681 |

FOREIGN PATENT DOCUMENTS

| | | |
|---|---|---|
| JP | 2001-69165 A | 3/2001 |
| WO | WO 99/26330 | 5/1999 |
| WO | WO 00/39907 | 7/2000 |
| WO | WO 03/073688 | 9/2003 |
| WO | WO 2006/073702 | 7/2006 |

OTHER PUBLICATIONS

"Cables to Go", download Oct. 16, 2001, http://www.cablestogo.com/product.asp?cat%5Fid=601&sku=27028.

"ExpressBus™ FU010 User Guide Packing Checklist", Belkin Components.

"FireWire Connector", downloaded Oct. 16, 2001, wysiwyg://76/http://developer.apple.com/...es/Macintosh_CPUs_G3/ibook/ibook-27.html.

"FireWire", downloaded Oct. 16, 2001, wysiwyg://42/http://developer.apple.com/hardware/FireWire.

"How to Connect Your Computer, PC Hardware", downloaded Oct. 16, 2001, http:///www.scar.utoronto.ca/~ccweb/faculty/connecthowto.html.

"IEEE 1394/UBS Comparison", downloaded Oct. 16, 2001, www.genitech.com.au/Library/TechSupport/infobits/firewire_vs_usb.htm.

"Making USB Work", downloaded Oct. 16, 2001, PC Magazine: PC Tech (Making USB Work) wysiwyg://55/http://www.zdnet.com/pcmag/pctech/content/18/04/tu1804.001.html.

"PMC FW2 IEEE1394 FireWire Controller", downloaded Oct. 16, 2001, http://www.bvmltd.co.uk/PMCfw2ds.html.

"Why FireWire is Hot!Hot!Hot!", downloaded Oct. 16, 2001, "Impact.FireWire.SideBar", http://www.vxm.com/21R.35.html.

Ian Fried, "FireWire poised to become ubiquitous", downloaded Oct. 16, 2001, CNET News.com, 1394 Trade Association: Press, wysiwyg://32/http://1394ta.org/Press/2001Press/august/8.27.b.html.

Ian Fried, "New FireWire to blaze faster trail", downloaded Oct. 16, 2001, CNET News.com, http://news.cnet.com/news/0-1006-200-6021210.html.

International Search Report in PCT application PCT/US02/33856 dated Mar. 14, 2003.

Michael D. Johas Teener, "Understanding FireWire: The IEEE 1394 Standards and Specifications", downloaded Oct. 16, 2001, wysiwyg://9/http://www.chipcenter.com/networking/ieee1394/main.html.

International Search Report in PCT application PCT/US05/024906 dated Mar. 15, 2006.

Full English Translation of Japanese Kokai Patent Application #2001-69165A, Takeshi Koura.

"Introduction to Public Key Cryptography," Oct. 9, 1998, printed from http://developer.netscape.com/docs/manuals/security/pkin/contents.htm on Oct. 6, 2004.

Brentrup, "Public Key Cryptography Demystified," Campus Technology, printed from http://www.campus-technology.com/article.asp?id=7626 on Oct. 6, 2004.

Whittle, "Public Key Authentication Framework: Tutorial," First Principles Consulting, Jun. 2, 1996.
Belkin iPod Voice Recorder, Product Specification Sheet, printed Jun. 16, 2004.
International Search Report and Written Opinion dated May 15, 2006 for corresponding PCT Application No. PCT/US2005/045040.
Menezes et al., "Handbook of Applied Cryptography," Identification and Entity Authentication, pp. 385-424.
"The Authoritative Dictionary of IEEE Standard Terms", 200, IEEE Press, 7$^{th}$ edition, pp. 1215.
"Firewire Finally Comes Home," Charles Severance, Computer, Nov. 1998, pp. 117-118.
Office Action dated Nov. 27, 2007 in U.S. Appl. No. 11/270,901.
International Search Report dated Feb. 18, 2008 for corresponding PCT Application No. PCT/US2007/004811.
Written Opinion dated Feb. 18, 2008 for corresponding PCT Application No. PCT/US2007/004811.
Office Action dated May 2, 2008 in U.S. Appl. No. 11/270,901.
Office Action dated May 5, 2008 in U.S. Appl. No. 11/754,932.
Office Action dated Dec. 12, 2008 in EP Application No. 07 751.563.3.
Office Action dated Nov. 14, 2008 in U.S. Appl. No. 11/270,901.
Office Action dated Jan. 13, 2009 in U.S. Appl. No. 11/754,932.
Office Action dated Oct. 15, 2008 in U.S. Appl. No. 11/754,932.
Office Action dated Jul. 30, 2009 in U.S. Appl. No. 11/754,932.
LTC1735-1, High Efficiency Step-Down Switching Regulator, Linear Technology Corporation, pp. 1-28.
LTC1731-4, Single Cell Lithium-Ion Linear Battery Charger Controller, Linear Technology Corporation, pp. 1-9.
Office Action dated Jun. 2, 2009 in U.S. Appl. No. 11/270,901.
Office Action dated May 15, 2009 in U.S. Appl. No. 11/754,932.
Office Action dated Oct. 29, 2009 in U.S. Appl. No. 11/754,932.

* cited by examiner

POWER MANAGEMENT IN A PORTABLE MEDIA DELIVERY SYSTEM

FIELD OF INVENTION

This invention relates generally to personal, portable electronic devices such as media players, radios and the like.

DESCRIPTION OF RELATED ART

Recent developments in consumer electronics have included the introduction of remote client devices such as portable media players (such as MP3 players, minidisk players), cell phones, personal digital assistants (PDAs) and the like. For example, in the case of an MP3 player (or, for that matter, any other digital media playback device), a number of digitized audio files are stored in a storage medium included in or coupled to the MP3 player in a fashion deemed most suitable to the user. Until recently, the listening enjoyment of these stored music files is typically limited to the use of earphones or other individual listening devices preventing the user from providing a listening experience to a group of devotees. In order to provide such a listening experience, a number of portable accessories that can be connected to the MP3 player have been developed that provide for broadcasting of played digital music files to more than a single person. Unfortunately, however, the typical power requirements for useful operation of both the MP3 player and accessory are substantially different owing to the fact that the accessory must be able to drive large speakers that consume much power whereas the MP3 player is typically designed to drive small personal listening devices, such as earphones. When connected together, this disparity in power consumption can limit the overall operation of the system since both systems must be operational.

Therefore, providing a method, system, and apparatus for managing power in a portable media delivery system is desirable.

SUMMARY OF THE INVENTION

A method, system, and apparatus for managing power in an electronic device is described. In one embodiment, a method for managing power in an electronic device powered by only a plurality of internal power supplies in a DC mode is described. When the electronic device is in the DC mode, the electronic device controls a transfer of an amount of charge between at least two of the plurality of internal power supplies. In one aspect of the invention, the amount of charge transferred is sufficient for the electronic device to operate for a predetermined period of time in the DC mode.

In another embodiment, a method for managing power in a consumer electronic product that includes a portable media player arranged to store a plurality of digital media files connected to a media delivery accessory having at least one speaker is described. In the DC mode, the consumer electronic product controls a transfer of an amount of charge between internal power supplies in the media delivery accessory and the media player by the consumer electronic product.

In yet another embodiment, a consumer electronic product having a media player arranged to process a selected one of a plurality of digital media files stored therein and a media delivery accessory unit connected to the media player arranged to broadcast an audio signal generated from the processed digital media file is described. When the consumer electronic product is operating in a DC mode, the consumer electronic product controls a charge transfer between internal power supplies in the media delivery accessory and the media player.

In still another embodiment, computer program product executable by a processor for managing power in a consumer electronic product that includes a portable media player arranged to store a plurality of digital media files connected to a media delivery accessory having at least one speaker is described. The computer program product includes computer code for controlling a transfer of an amount of charge between internal power supplies in the media delivery accessory and the media player by the consumer electronic product when the consumer electronic product is in a DC mode, and computer readable medium for storing the computer code.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention will be better understood by reference to the following description taken in conjunction with the accompanying drawings.

DETAILED DESCRIPTION OF SELECTED EMBODIMENTS

Reference will now be made in detail to a particular embodiment of the invention an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

A method, system, and apparatus for managing power in a consumer electronic product that includes a media delivery accessory connected to a portable media player are described. In particular, when the consumer electronic product is operating in a self powered mode, or DC mode (i.e., is powered only by internal power supplies, such as batteries), the consumer electronic product controls a transfer of charge between the media player and the media delivery accessory.

An aspect of the invention provides for the transfer to occur for a predetermined length of time regardless of the charge status of an internal power supply included in the media player. Another aspect of the invention, however, provides for a determination of an amount of charge to be transferred based in part upon a current operating state of the media player that includes a current charge status of the media player internal power supply.

The invention will now be described in terms of a consumer electronic product that includes a portable media player capable of storing a number of multimedia digital files connected to a media delivery accessory arranged to broadcast audio by way of at least one speaker. In the case of the media player being a pocket sized portable player (such as the IPOD™ player manufactured by the Apple Computer Inc. of Cupertino, Calif.), the multimedia data files can include MP3 files as well as any other appropriately formatted data files.

Figure 1:
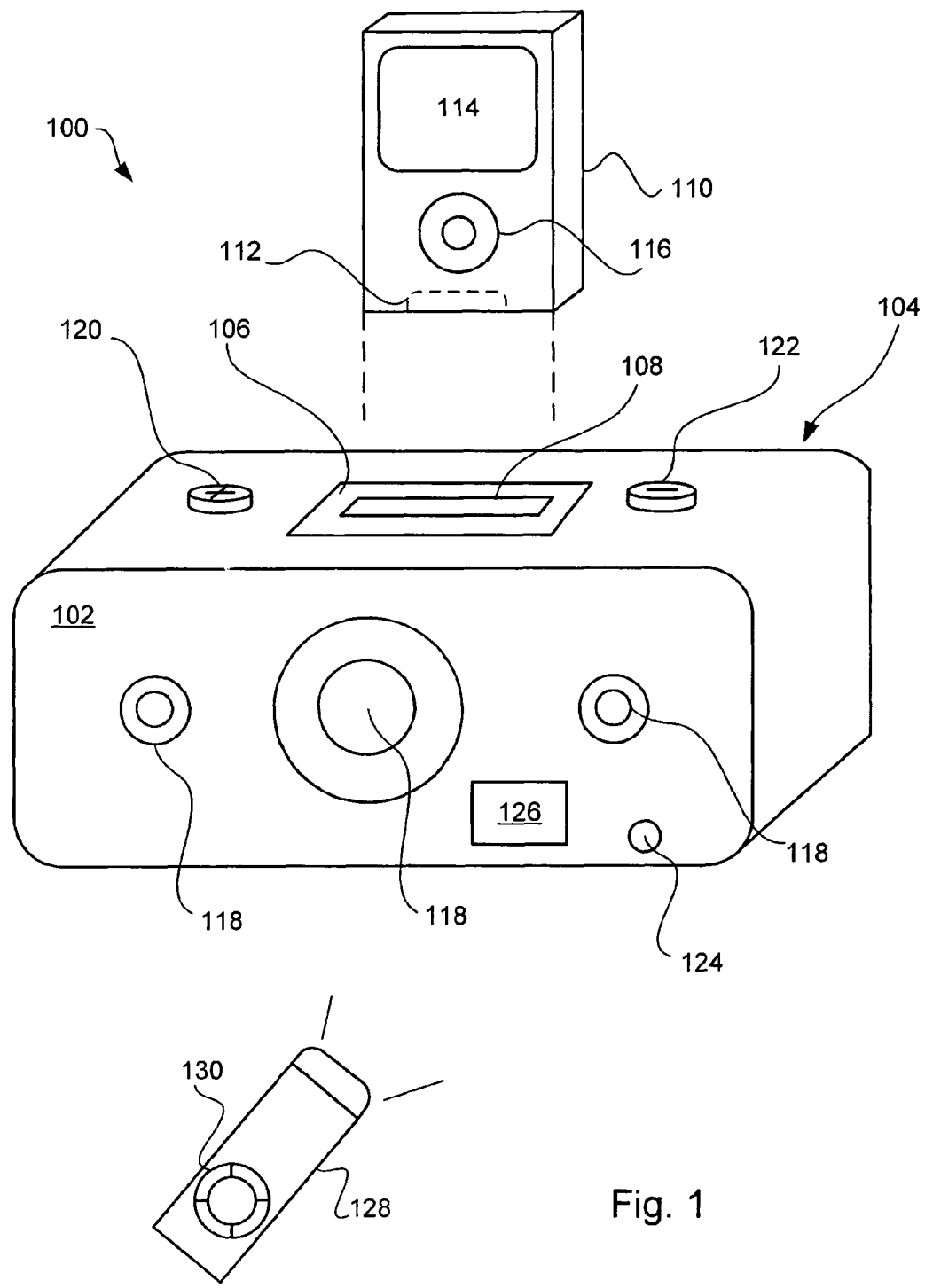
FIG. 1 shows a system in accordance with an embodiment of the invention.

FIG. 1 is a diagram of a media system 100 according to one embodiment of the invention. The media system 100 includes a media delivery accessory 102. The media delivery accessory 102 serves to output media, such as outputting audio sounds. For example, the audio sound can pertain to music. The media delivery accessory 102 can also be referred to as a media delivery accessory.

The media delivery accessory 102 includes a housing 104 that supports or contains various components of the media delivery accessory 102. The housing 104 includes an opening or receptacle 106 and a connector 108 disposed therein. Beyond the media delivery accessory 102, the media system 100 also includes a portable media player 110. The portable media player 110 is, more generally, a portable computing device, such as the mobile computing device 200 illustrated in FIG. 2. Although the portable media player 110 is fully operational apart from the media delivery accessory 102, the portable media player 110 can be connected to the media delivery accessory 104. In particular, the portable media player 110 includes a connector 112. The portable media player 110 can be placed in the opening or receptacle 106 such that the connector 108 physically and electrically connects with the connector 112 of the portable media player 110, thereby connecting the portable media player 110 to the media delivery accessory 104.

The media delivery accessory 102 includes at least one speaker 118. In one embodiment, the speakers 118 include a pair of midrange speakers and a subwoofer speaker. The housing 104 also includes volume control devices 120 and 122. In one embodiment, the volume control devices 120 and 122 are buttons. Still further, the housing 104 can include an indicator light 124 that provide visual feedback to the user regarding the operation or condition of the media delivery accessory 102. The housing 104 can also include a receiver window 126 that can be used by a receiver internal to the housing 104 when picking-up wireless transmissions from a remote controller 128 having a plurality of user input controls 130. It should be noted that the remote controller 128 could transmit any of a number of signals such as infrared, radio frequency (RF), audio signals, and the like. Through use of the user input controls 130 on the remote controller 128, the user is able to indirectly interact with the portable media player 110 or directly interact with the media delivery accessory 102. For example, the user of the remote controller 128 can interact with the user input controls 130 to select a media item to be played on the portable media player 110 with its audio output being provided by the speakers 118 of the media delivery accessory 102. The remote controller 128 can also be used to alter the volume of the audio output from the media delivery accessory 102.

Figure 2:
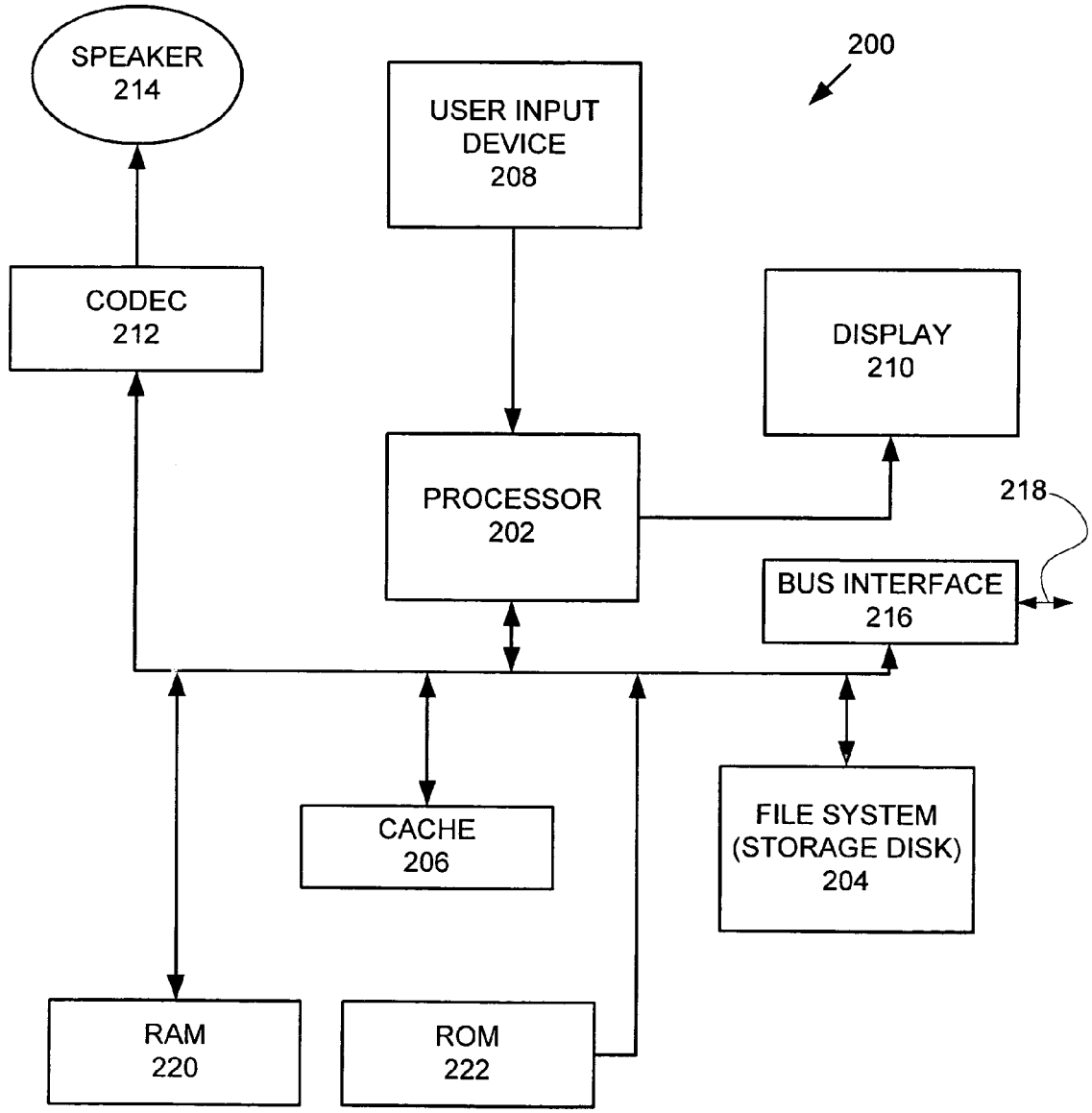
FIG. 2 shows a portable media player according to one embodiment of the invention.

FIG. 2 shows a portable media player 200 according to one embodiment of the invention. The media player 200 is, for example, suitable for use as the battery powered portable media player 110 shown in FIG. 1. The media player 200 includes a processor 202 that pertains to a microprocessor or controller for controlling the overall operation of the media player 200. The media player 200 stores media data pertaining to media assets in a file system 204 and a cache 206. The file system 204 is, typically, a storage disk or a plurality of disks. The file system 204 typically provides high capacity storage capability for the media player 200. However, since the access time to the file system 204 is relatively slow, the media player 200 can also include a cache 206. The cache 206 is, for example, Random-Access Memory (RAM) provided by semiconductor memory. The relative access time to the cache 206 is substantially shorter than for the file system 204. However, the cache 206 does not have the large storage capacity of the file system 204. Further, the file system 204, when active, consumes more power than does the cache 206. The power consumption is particularly important when the media player 200 is a portable media player that is powered by a battery (not shown). The media player 200 also includes a RAM 220 and a Read-Only Memory (ROM) 222. The ROM 222 can store programs, utilities or processes to be executed in a non-volatile manner. The RAM 220 provides volatile data storage, such as for the cache 206.

The media player 200 also includes a user input device 208 that allows a user of the media player 200 to interact with the media player 200. For example, the user input device 208 can take a variety of forms, such as a button, keypad, dial, etc. Still further, the media player 200 includes a display 210 (screen display) that can be controlled by the processor 202 to display information to the user. A data bus 224 can facilitate data transfer between at least the file system 204, the cache 206, and the processor 202. The media player 200 also includes a bus interface 216 that couples to a data link 218. The data link 218 allows the media player 200 to couple to a host computer over a wired connection.

In one embodiment, the media player 200 serves to store a plurality of media assets (e.g., songs) in the file system 204. When a user desires to have the media player 200 play a particular media item, a list of available media assets is displayed on the display 210. Then, using the user input device 208, a user can select one of the available media assets. The processor 202, upon receiving a selection of a particular media item, supplies the media data (e.g., audio file) for the particular media item to a coder/decoder (CODEC) 212. The CODEC 212 then produces analog output signals for a speaker 214. The speaker 214 can be a speaker internal to the media player 200 or external to the media player 200. For example, headphones or earphones that connect to the media player 200 would be considered an external speaker.

For example, in a particular embodiment, the available media assets are arranged in a hierarchical manner based upon a selected number and type of groupings appropriate to the available media assets. For example, in the case where the media player 200 is an MP3 type media player, the available media assets take the form of MP3 files (each of which corresponds to a digitally encoded song or other audio rendition) stored at least in part in the file system 204. The available media assets (or in this case, songs) can be grouped in any manner deemed appropriate. In one arrangement, the songs can be arranged hierarchically as a list of music genres at a first level, a list of artists associated with each genre at a second level, a list of albums for each artist listed in the second level at a third level, while at a fourth level a list of songs for each album listed in the third level, and so on.

The media player 200 also includes a wireless network interface 226 arranged to wirelessly transmit any selected data from the media player 200 to any appropriately configured receiver unit (e.g., the wireless network interface 114) over a wireless network. In the embodiment shown in FIG. 1, the wireless network interface 226 that takes the form of, for example, a "WiFi" interface according to the IEEE 802.11b or 802.11g standards. Other wireless network standards could also be used, either in alternative to the identified standards or in addition to the identified standards. Such other network standards could include the IEEE 802.11a standard or the Bluetooth standard.

In one embodiment, the media player 200 is a portable computing device dedicated to processing media such as audio. For example, the media player 200 can be a media player (e.g., MP3 player), a game player, a remote controller, a portable communication device, and the like. These devices are generally battery-operated and highly portable so as to allow a user to listen to music, play games or video, record video or take pictures, communicate with others, and/or control other devices. In one implementation, the media player 200 is a handheld device that is sized for placement into a pocket or hand of the user. By being handheld, the media player 200 is relatively small and easily handled and utilized by its user. By being pocket sized, the user does not have to directly carry the device and therefore the device can be taken almost anywhere the user travels (e.g., the user is not limited by carrying a large, bulky and often heavy device, as in a portable computer). Furthermore, the user's hands may operate the device, no reference surface such as a desktop is needed.

Figure 3:
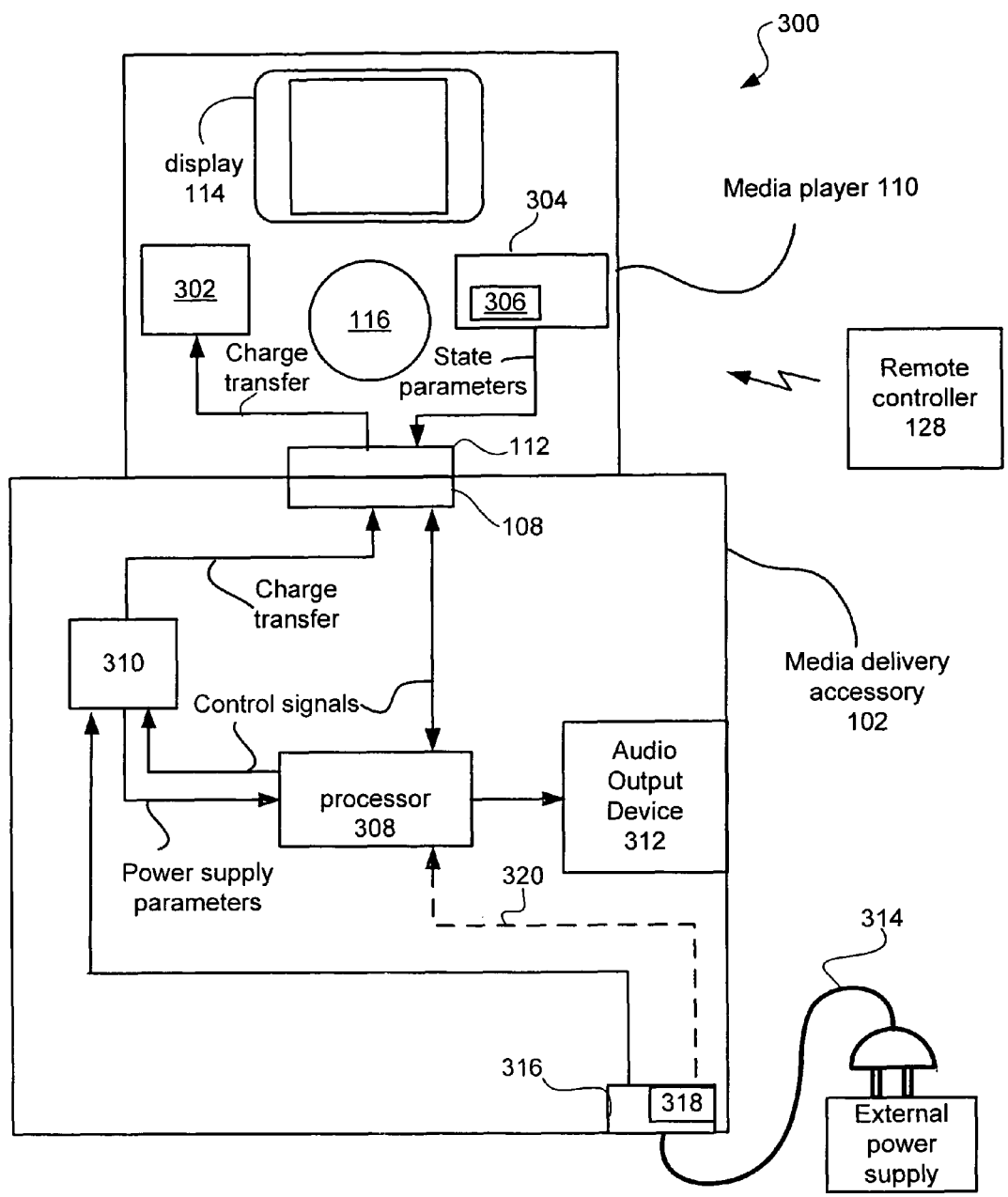
FIG. 3 shows schematic representation of a consumer electronic product in accordance with an embodiment of the invention.

FIG. 3 shows a consumer electronic product 300 in accordance with an embodiment of the invention. In the described embodiment, the consumer electronic product 300 includes the portable media player 110 and the media delivery accessory 102. In the described embodiment the media player 110 is connected to the media delivery accessory 102 when the connector 108 physically and electrically connects with the connector 112 thereby creating a data/power pathway between the portable media player 110 and the media delivery accessory 102. The media player 102 includes a media player internal power supply 302 arranged to store charge used to power to media player 110 before (including booting up) and during playback of selected digital media files. The media player 110 also includes a memory unit 304 suitably arranged to store, in addition to media files, media player operational parameters 306 indicative of a current operating state of the media player 110. For example, the media player operational parameters 306 can include an indication of whether or not a backlight used to illuminate the display 114 is operational, and if so, the duration of time and intensity of the backlight. The media player operational parameters 306 can also include a current charge status of the internal power supply 302.

The media delivery accessory 102 also includes a processor unit 308 arranged to process executable instructions and provide a number of control signals used to control, in part, a media delivery accessory internal power supply 310 and an audio output device 312. When configured as the illustrated consumer electronic product 300, the data/power path between the media player 110 and the media delivery accessory 102 is uni-directional with regards to transferring charge from the media delivery accessory internal power supply 310 to the media player internal power supply 302 but bi-directional with regards to transferring data between the media player 110 and the media delivery accessory 102. It should be noted that the internal power supplies 310 and 302 are contemplated to be any of a number and type of internal power supplies suitable for portable applications such as a battery (alkaline, nickel metal hydride, etc.) or a small fuel cell.

A detachable power cable 314 provides power to the internal power supply 310 from an external power supply when connected to a power port 316. In a particularly useful embodiment, the power port 316 includes a power cable sensor 318 that reacts to a power cable connect/disconnect event by sending a power cable status signal 320 to the processor unit 308 that signals in the case of a disconnect event that the consumer electronic product 300 is in a self powered mode (i.e., power is supplied only by the internal power supplies 310 and 302). In the self-powered mode, the processor 308 instructs the media delivery internal power supply 310 to transfer charge to the media player internal power supply 302 by way of the power path created by the connection between the media player 110 and the media delivery accessory 110.

In another embodiment, when the processor 308 receives the disconnect signal, a determination is made by the processor 308 whether or not a charge transfer between the internal power supplies 310 and 302 is necessary (depending upon the amount of charge already stored in the respective internal power supplies and the current operating state of the media player 110). If the processor 308 determines that there is not sufficient stored available charge in the internal power supply 302 in order for the consumer electronic product 300 to operate uninterrupted for at least a predetermined period of time, then the processor 308 instructs the internal power supply 310 to transfer the requisite amount of charge to the internal power supply 302. It should be noted that this procedure also applies in those cases where the consumer electronic product 300 is powered up and the cable 314 is not carrying power from the external power supply (either it is not connected or the external power supply is off).

On the other hand, when the power cable sensor 318 senses a power connect event, the power cable sensor 318 sends the power cable status signal 320 to the processor 308. The processor 308, in turn, responds by instructing the internal power supply 310 to receive power directly from the external power supply by way of the cable 314 and to recharge the charge unit 302, if necessary, to a predetermined charge level. (It should be noted that it is contemplated that it may be desirable to recharge internal power supply 310 as well.)

When the media player 110 is connected to the media delivery accessory 102 (or in those situations where the media player 110 is already connected to the media delivery accessory 102 and then powered on), the processor unit 308 retrieves the appropriate media player operational parameters 306 (such as current available charge stored in the storage unit 302, current operational state of the media player 102, etc.) from the memory 304 in order to determine an amount of charge to be transferred between the media delivery accessory 102 and the media player 110 in order for the consumer electronic product 300 to operate for at least a predetermined length of time (such as, for example, 30 minutes). In addition to the amount of currently available charge stored in the internal power supply 302, the processor 308 retrieves information regarding the current state of the internal power supply 310 (such as the amount of available charge stored therein). It should be noted that since the internal power supply 310 is designed to support operation of the accessory 102 the intrinsic storage capacity of the internal power supply 310 is substantially greater than that of the internal power supply 302. Therefore it is presumed that the internal power supply 310 will in all likelihood provide the requisite charge to the internal power supply 302. However, the invention should not be construed to be limited in this regard. In those situations where the internal power supply 302 is found to be able to provide charge to the power unit 310, then such a transfer is made.

In another embodiment of the invention, if the processor 308 determines that there is not enough charge available to transfer between the media player internal power supply 302 and the media delivery accessory internal power supply 310 to power the consumer electronic product 300 for at least the predetermined length of time, then the processor 308 signals the length of time that the consumer electronic product 300 can operate without interruption (that would, of course, be less than the predetermined length of time). However, in those cases where the amount of available charge from the internal power supply 310 is less than an amount suited for operating the consumer electronic product in the self powered mode, or DC mode, then the processor 308 provides an external signal (such as a blinking red indicator light 124) to indicate that the consumer electronic product 300 can not be operated in a self powered mode and therefore the power cable 314 must be connected to an active external power supply until such time as there is enough available charge stored in the power units 310 and 302 to operate the consumer electronic product 300 in a self powered mode (and thereby allowing the power cable 314 to be disconnected).

It should be noted that at any time the power cable 314 is connected to the external power supply while the consumer electronic product 300 is operating in the self-powered mode, then, the processor 308 immediately signals the consumer electronic product 300 to enter an external power mode, or AC mode. In the external power mode, the charge provided by the external power supply by way of the cable 314 is used to not only operate the consumer electronic product 300, but to recharge (if necessary) the internal power supplies 302 and 310.

Figure 4:
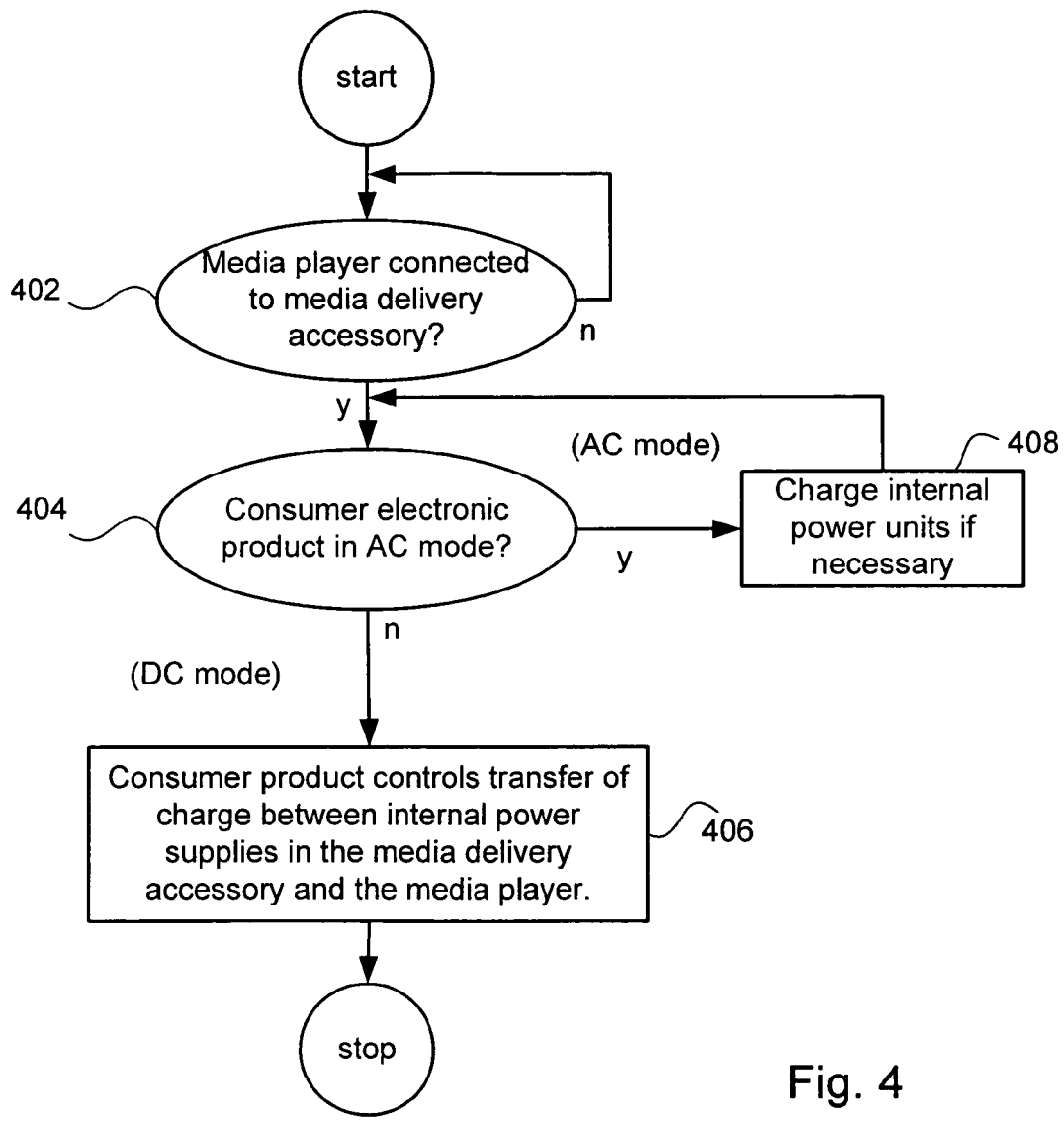
FIGS. 4-6 show flowcharts detailing operational processes in accordance with an embodiment of the invention.

FIG. 4 shows a flowchart detailing a process 400 in accordance with an embodiment of the invention. The process 400 begins at 402 by determining if the media player is operating in the DC mode. When operating in the DC mode, the consumer electronic product controls the transfer of charge between the media delivery accessory and the media player at 404. However, when operating in the AC mode, the external power supply provides power to the consumer electronic product, at 408. It should be noted that a processor is continually monitoring for a power cable connect and disconnect event that would change the operating mode from the AC mode to the DC mode, respectively.

Figure 5:
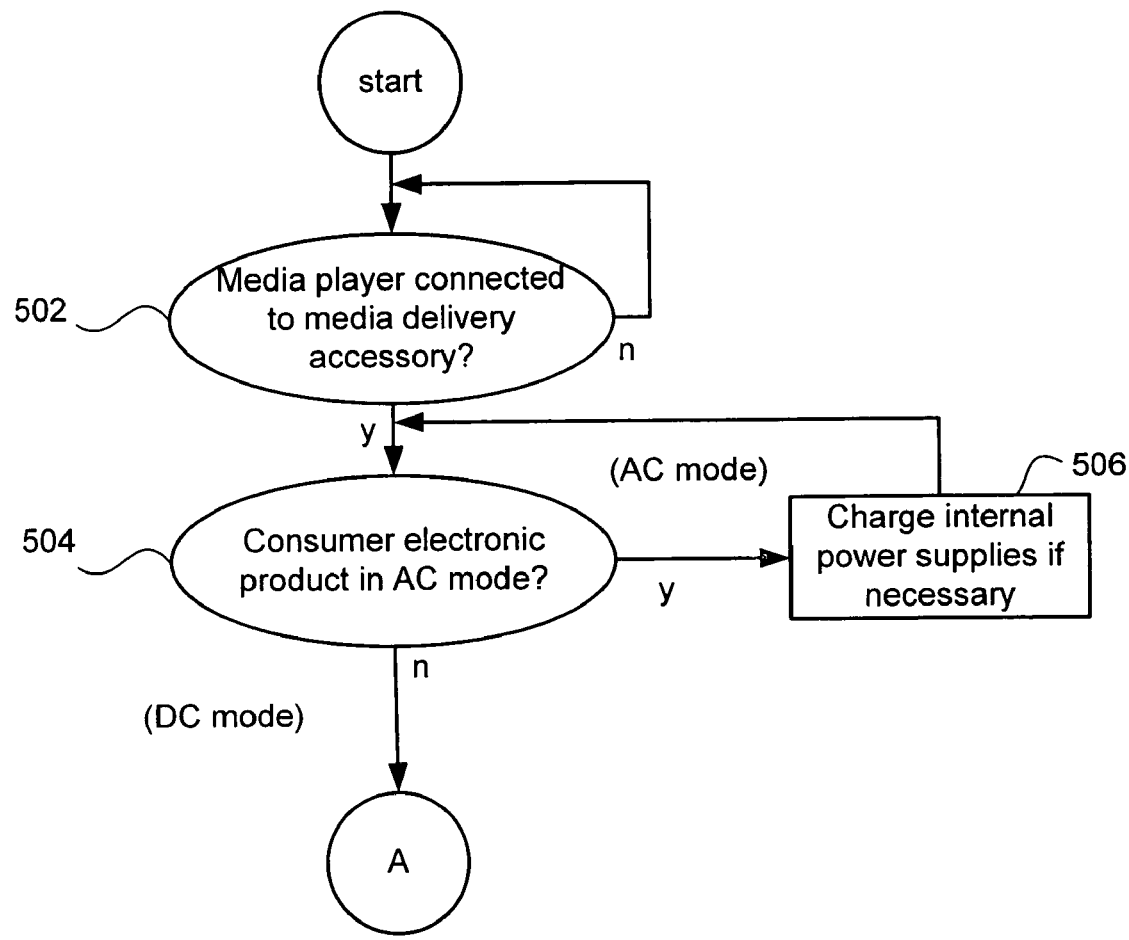
Figure 6:
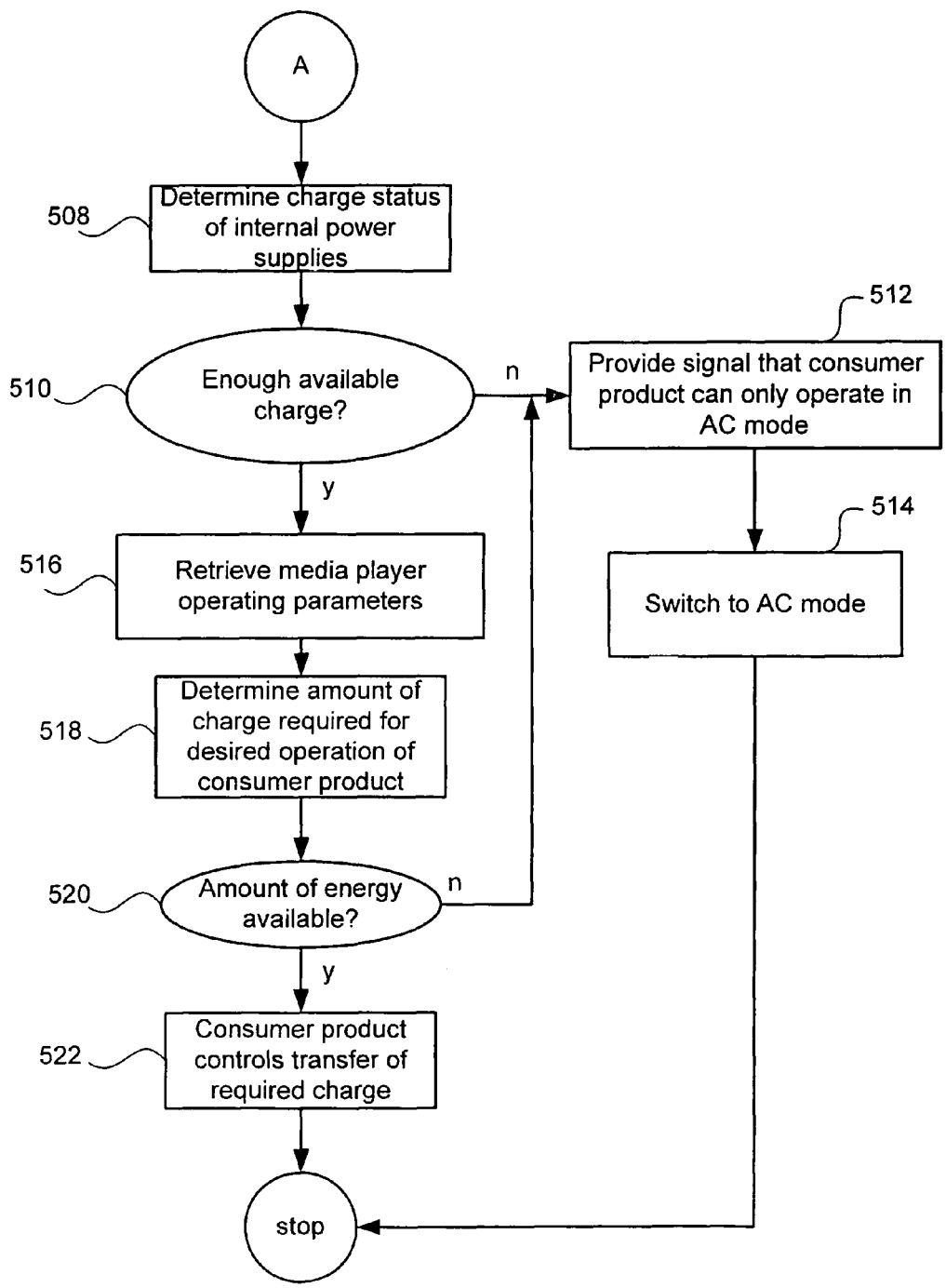

FIGS. 5 and 6 shows a flowchart detailing a process 500 in accordance with another embodiment of the invention. The process 500 begins at 502 by determining if the media player is connected to the media delivery accessory. When the media player and the media delivery accessory unit are connected, a determination is made at 504 if the consumer electronic product is operating in the AC mode. In one embodiment, this determination can be made when the processor determines that the power cable is connected to and receiving power from an external power supply. In the case where the consumer electronic product is operating in the AC mode, then at 506, the internal power supplies in the media player and/or the media delivery accessory are recharged to a predetermined charge level. If, however, if the consumer electronic product is determined to be in the DC mode, a determination of the charge status of the media delivery accessory internal power supply is made at 508. It should be noted that in some cases, the charge status of the media player internal power supply can also be determined using, for example, charge status information stored in the media player memory unit.

If, based upon the charge status, it is determined at 510 that there is not enough available charge in the media delivery accessory internal power supply to supply to the media player internal power supply in order for the consumer electronic product to operate for a predetermined length of time, then at 512 an external signal is provided indicating that the consumer electronic product can only operate in the AC mode and at 514, the consumer electronic product is switched to AC mode.

If, however, the charge status indicates that there is sufficient available charge in the media delivery accessory internal power supply, then at 516, media player operation parameters are retrieved from the media player memory unit indicating a current operating state of the media player unit. At 518, a determination is made of the amount of charge required to be transferred from the media delivery accessory internal power supply to the media player internal power supply in order for the consumer electronic product to operate as desired. It should be noted that in desired modes of operation can include having the consumer electronic product operational for a predetermined length of time as well as maximizes an amount of time that the individual components of the consumer electronic product can operate from their respective internal power supplies.

If it is determined that the amount of charge is available at 520, the consumer electronic product controls the transfer of the determined amount of charge from the media accessory internal power supply and the media player internal power supply at 522. On the other hand, if at 520 it is determined that there is insufficient available charge, then the control is passed back to 512 indicating that the consumer electronic product can only operate in the AC mode.

Although the media items of emphasis in several of the above embodiments where audio items (e.g., audio files or songs), the media items are not limited to audio items. For example, the media item can alternatively, pertain to recorded discussions and the like.

The invention is preferably implemented by software, but can also be implemented in hardware or a combination of hardware and software. The invention can also be embodied as computer readable code on a computer readable medium. The computer readable medium is any data storage device that can store data, which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

What is claimed is:

1. A method for managing power in electronic device operating at a current operating state and powered by only a plurality of internal power supplies in a DC mode, comprising:

when the electronic device is in the DC mode,
controlling a transfer of an amount of charge between at least two of the plurality of internal power supplies by the electronic device wherein the amount of charge transferred is sufficient for the electronic device to operate uninterrupted for a predetermined period of time at the current operating state wherein the electronic device includes a number of electronic components each of which are powered in the DC mode by a corresponding one of the plurality of internal power supplies.

2. A method as recited in claim 1, wherein the amount of charge transferred between the at least two internal power supplies maximizes an amount of time that the corresponding electronic components can each operate from their respective internal power supplies.

3. A method as recited in claim 2, wherein the plurality of electronic components includes a media player arranged to store a plurality of digital media files connected to a media delivery accessory having at least one speaker.

4. A method for managing power in a consumer electronic product operating at a current operating state and that includes a portable media player arranged to store a plurality of digital media files connected to a media delivery accessory having at least one speaker, comprising:

when the consumer electronic product is in a DC mode,
controlling a transfer of an amount of charge between internal power supplies in the media delivery accessory and the media player by the consumer electronic product wherein the amount of charge transferred maximizes an amount of time that the media player and the media delivery accessory can each operate uninterrupted from their respective internal power supplies at their respective current operating states; and
providing power supply parameters to the processor by the media delivery accessory internal power supply indicative of a media delivery accessory internal power supply charge status;
if the charge status indicates that the media player internal power supply has available for transfer at least the amount of charge for the consumer electronic product to operate uninterrupted for a predetermined period of time, then
transferring the required amount of charge from the media delivery accessory internal power supply to the media player charge internal power supply, otherwise
providing an indication that the consumer electronic product should operate in an AC mode.

5. A method as recited in claim 4, wherein the amount of charge transferred is sufficient for the consumer electronic product to operate uninterrupted for a predetermined period of time.

6. A method as recited in claim 4, further comprising;
providing power supply parameters to the processor by the media delivery accessory internal power supply indicative of a media delivery accessory internal power supply charge status;
if the charge status indicates that the media player internal power supply has available for transfer at least the amount of charge required to maximize the amount of time that the media player and the media delivery accessory can each operate from their respective internal power supplies, then
transferring the required amount of charge from the media delivery accessory internal power supply to the media player charge internal power supply, otherwise
providing an indication that the consumer electronic product should operate in an AC mode.

7. A method as recited in claim 4, further comprising, wherein when the consumer electronic product is controlling the transfer of the charge,
generating an audio signal from a selected one of the plurality of digital media files by the portable media player; and broadcasting the audio signal by the at least one speaker.

8. A consumer electronic product operating at a current operating state, comprising:

a media player arranged to process a selected one of a plurality of digital media files stored therein, the media player comprising:
a memory unit arranged to store the plurality of digital media files and a set of media player operational parameters indicative of a current operating state of the media player; and
a media player connector coupled to the memory unit and the media player internal power supply; and
a media delivery accessory unit connected to the media player arranged to broadcast an audio signal generated from the processed digital media file, wherein when the consumer electronic product is operating in a DC mode, the consumer electronic product controls a charge transfer between internal power supplies in the media delivery accessory and the media player wherein the amount of charge transferred between the internal power supplies is such that the consumer electronic product can operate uninterrupted for at least a predetermined amount of time at the current operating state.

9. A consumer electronic product as recited in claim 8, wherein the media delivery accessory comprises:
a processor unit arranged to execute instructions and provide control signals;
an external power interface connected to the media delivery internal power supply for receiving a power cable suitable for transferring external power from an external power supply to the media delivery internal power supply; and
a media delivery accessory connector coupled to the processor and the media delivery accessory internal power supply that when connected with the media player connector provides a data/power path between the media delivery accessory and the media player.

10. A consumer electronic product as recited in claim 9, comprising:
a power cable connection sensor coupled to the processor for sensing when the power cable has been disconnected from the external power supply that responds by providing a disconnect signal to the processor.

11. A consumer electronic product as recited in claim 10, wherein when the power cable connection sensor senses that the power cable is connected to the external power supply and receiving external power, then the power cable connection sensor sends a connect signal to the processor that responds by directing the media delivery internal power supply to receive the external power.

12. A consumer electronic product as recited in claim 11 wherein the media delivery accessory internal power supply provides power supply parameters to the processor indicative of a media delivery accessory internal power supply charge status.

13. A consumer electronic product as recited in claim 12 wherein if the charge status indicates that the media player internal power supply has available for transfer at least the amount of charge required for the consumer electronic product to operate uninterrupted for at least the predetermined amount of time, then the required amount of charge is transferred from the media delivery accessory internal power supply to the media player charge internal power supply, otherwise an indication that the consumer electronic product should operate in an AC mode is provided.

14. A computer readable storage medium including at least computer program code for managing power in a consumer electronic product that includes a portable media player arranged to store a plurality of digital media files connected to a media delivery accessory having at least one speaker, comprising:

computer program code for controlling a transfer of an amount of charge between internal power supplies in the media delivery accessory and the media player by the consumer electronic product when the consumer electronic product is in a DC mode wherein the amount of charge transferred between the internal power supplies is such that the consumer electronic product can operate uninterrupted for at least a predetermined amount of time at a current operating state wherein the amount of charge transferred maximizes an amount of time that the media player and the media delivery accessory can each operate from their respective internal power supplies.

15. The computer readable storage medium as recited in claim 14, wherein the amount of charge transferred is sufficient for the consumer electronic product to operate uninterrupted for a predetermined period of time.

16. The computer readable storage medium as recited in claim 15, further comprising;

computer code for providing power supply parameters to the processor by the media delivery accessory internal power supply indicative of a media delivery accessory internal power supply charge status;

computer code for transferring the required amount of charge from the media delivery accessory internal power supply to the media player charge internal power supply if the charge status indicates that the media player internal power supply has available for transfer at least the amount of charge for the consumer electronic product to operate uninterrupted for a predetermined period of time; and computer code for providing an indication that the consumer electronic product should operate in an AC mode if the charge status indicates that the media player internal power supply does not available for transfer at least the amount of charge for the consumer electronic product to operate uninterrupted for a predetermined period of time.

17. The computer readable storage medium as recited in claim 14, further comprising;

computer code for providing power supply parameters to the processor by the media delivery accessory internal power supply indicative of a media delivery accessory internal power supply charge status;

computer code for transferring the required amount of charge from the media delivery accessory internal power supply to the media player charge internal power supply if the charge status indicates that the media player internal power supply has available for transfer at least the amount of charge required to maximize the amount of time that the media player and the media delivery accessory can each operate from their respective internal power supplies; and computer code for providing an indication that the consumer electronic product should operate in an AC mode if the charge status indicates that the media player internal power supply does not have available for transfer at least the amount of charge required to maximize the amount of time that the media player and the media delivery accessory can each operate from their respective internal power supplies.

18. Computer readable storage medium as recited in claim 14, further comprising, wherein when the consumer electronic product is controlling the transfer of the charge, computer code for generating an audio signal from a selected one of the plurality of digital media files by the portable media player; and computer code for broadcasting the audio signal by the at least one speaker.

19. A method for managing power in a consumer electronic product that includes a portable media player arranged to store a plurality of digital media files connected to a media delivery accessory having at least one speaker, comprising:

when the consumer electronic product is in a DC mode, controlling a transfer of an amount of charge between internal power supplies in the media delivery accessory and the media player by the consumer electronic product wherein the amount of charge transferred maximizes an amount of time that the media player and the media delivery accessory can each operate uninterrupted from their respective internal power supplies at their respective current operating states;

providing power supply parameters to the processor by the media delivery accessory internal power supply indicative of a media delivery accessory internal power supply charge status;

if the charge status indicates that the media player internal power supply has available for transfer at least the amount of charge required to maximize the amount of time that the media player and the media delivery accessory can each operate from their respective internal power supplies, then transferring the required amount of charge from the media delivery accessory internal power supply to the media player charge internal power supply, otherwise providing an indication that the consumer electronic product should operate in an AC mode.

20. The method as recited in claim 19, wherein the media delivery accessory further comprises:

a processor unit arranged to execute instructions and provide control signals;

an external power interface connected to the media delivery internal power supply for receiving a power cable suitable for transferring external power from an external power supply to the media delivery internal power supply; and a media delivery accessory connector coupled to the processor and the media delivery accessory internal power supply that when connected with the media player connector provides a data/power path between the media delivery accessory and the media player.

21. The method as recited in claim 20, wherein the media delivery accessory includes a power cable connection sensor coupled to the processor for sensing when the power cable has been disconnected from the external power supply that responds by providing a disconnect signal to the processor.

22. The method as recited in claim 21, wherein when the power cable connection sensor senses that the power cable is connected to the external power supply and receiving external power, then the power cable connection sensor sends a connect signal to the processor that responds by directing the media delivery internal power supply to receive the external power.

23. A media delivery accessory, comprising:

a processor unit arranged to execute instructions and provide control signals;

a media delivery accessory internal power supply connected to the processor unit; and a media delivery accessory connector coupled to the processor and the media delivery accessory internal power supply that when optionally connected with a portable media player provides a data/power path between the media delivery accessory and the portable media player, wherein when the media delivery accessory is connected to the portable media player and the media delivery accessory is not connected to an external power supply and operating in a DC mode, the processor unit controls a charge transfer between the media delivery accessory internal power supply and a media player internal power supply wherein the amount of charge transferred between the internal power supplies is such that the media delivery accessory is capable of operating uninterrupted for at least a predetermined amount of time at a current operating state.

24. The media delivery accessory as recited in claim 23, further comprising:

an external power interface connected to the media delivery internal power supply for receiving a power cable suitable for transferring external power from the external power supply to the media delivery internal power supply.

25. The media delivery accessory as recited in claim 24, wherein the media delivery accessory includes a power cable connection sensor coupled to the processor unit for sensing when the power cable has been disconnected from the external power supply, the sensor responding by providing a disconnect signal to the processor unit.

26. The media delivery accessory as recited in claim 25, wherein when the power cable connection sensor senses that the power cable is connected to the external power supply and receiving external power, then the power cable connection sensor sends a connect signal to the processor unit that responds by directing the media delivery internal power supply to receive the external power.

* * * * *

UNITED STATES PATENT AND TRADEMARK OFFICE
CERTIFICATE OF CORRECTION

PATENT NO.       : 7,770,036 B2
APPLICATION NO.  : 11/364414
DATED            : August 3, 2010
INVENTOR(S)      : Dorogusker et al.

Page 1 of 1

It is certified that error appears in the above-identified patent and that said Letters Patent is hereby corrected as shown below:

On Title Page 2, in column 2, under "Other Publications", line 13, delete "UBS" and insert -- USB --, therefor.

In column 11, line 65, in claim 18, delete "Computer" and insert -- The computer --, therefor.

Signed and Sealed this
Twenty-second Day of November, 2011

David J. Kappos
*Director of the United States Patent and Trademark Office*